Aug. 2, 1927.
J. C. BALLEW
TIRE AND RIM
Filed Sept. 20, 1926
1,637,599
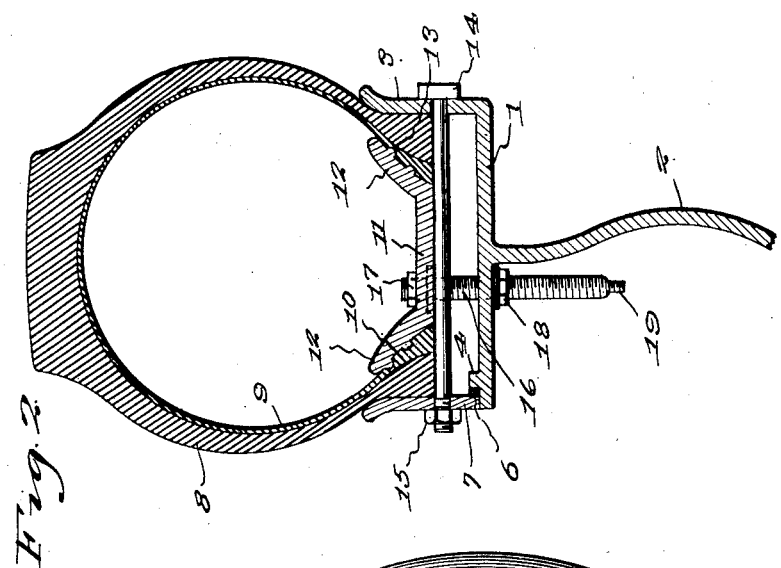
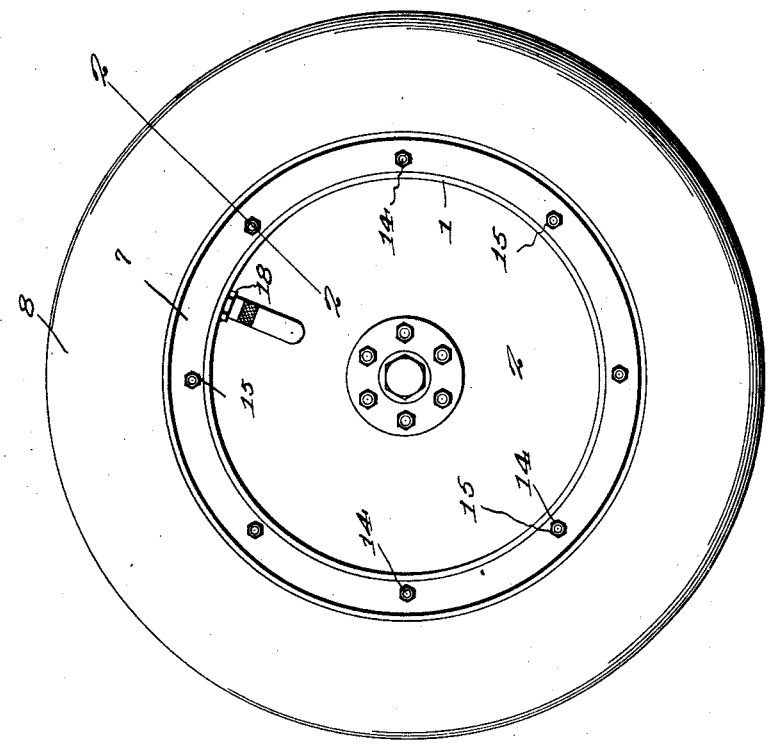
INVENTOR
J. C. Ballew
WITNESS:
ATTORNEY Patented Aug. 2, 1927.

1,637,599

UNITED STATES PATENT OFFICE.

JAMES C. BALLEW, OF AKRON, OHIO.

TIRE AND RIM.

Application filed September 20, 1926. Serial No. 136,629.

The object of this invention is the provision of a wheel rim for pneumatic tires of a construction and arrangement of parts whereby an air-tight joint is effected between the tire and the rim so that the employment of an inflatable inner-tube is not required.

A further object is the provision of a device for this purpose that is characterized by simplicity in construction, and reliability and efficiency in practical use.

To the attainment of the foregoing, the invention consists in the improvement as hereinafter described and definitely claimed.

In the drawings:

Figure 1 is a side elevation of my improvement.

Figure 2 is a sectional view on the line 2—2 of Figure 1.

In the showing of the drawings I have illustrated my improved rim having its felly portion 1 integrally formed on a disc wheel 2, but obviously the improvement may be attached to a wooden wheel. The felly 1 has a continuous flange 3 formed upon one of the edges thereof, and its outer face, adjacent to its opposite edge is provided with a continuous rib 4. Against this rib there rests a compressible gasket 6 and this gasket is contacted by the removable end 7 for the felly or rim 1.

The pneumatic tire, which is engaged by my improvement is indicated by the numeral 8 and may be of the usual construction. Preferably, the inner face of the tire has a filling of rubber 9, the same having its ends connected to or resting against substantially wedge-shaped heavy gum or like compressible members 10.

Received in the tire, there is a flat ring member 11 that has angularly disposed sides 12 whose outer faces are concaved and formed with continuous ribs 13.

Passing through the sides 3 and 7 of the improvement there are equidistantly spaced bolts 14 and on these bolts the thickened edges of the tire 8, the edges of the compressible wedge members 10 and the inner face of the ring member 11 rest. The bolts 14 are engaged by nuts 15, and by screwing these nuts home it will be apparent that the removable sides 7 of the rim will be forced toward the fixed side 3 thereof, thereby compressing the thickened or ribbed ends of the tire and the substantially wedge-shaped compressible annular members 10 between the sides of the tire and the sides 12 of the ring member 11. The ring member is held from either lateral or circumferential movement through the medium of a threaded stem 16 passing therethrough and passing through the rim or felly 1, the said stem being engaged by bolts 17 and 18 that contact respectively with the ring member 11 and with the felly or rim 1. The member 16 may be in the nature of an ordinary casing that carries the normally closed spring influenced valve whereby air is let into the inner tube of a tire, or may be of a special construction, but has arranged therein a normally closed spring influenced valve whose stem 19 projects through the outer end thereof, and whereby the tire 8 may be inflated in the usual manner.

The inner edges of the tire rest upon the bolts 14. By screwing the nuts 15 on the bolts 14, the ring plate 7 is adjusted with respect to the flange 3 of the member 1, and such adjustment compresses the thickened edges 13' of the tire 8 between the sides 12 of the ring member 11 and the wedge-shaped parts 10 of the filler 9, thus providing an air tight joint between the tire and the supporting means therefor.

The simplicity of my construction and the advantages thereof, will be apparent when the foregoing description has been carefully read in connection with the accompanying drawings so that further detail description will not be attempted.

Having described the invention, I claim:

1. A rim for wheels carrying pneumatic tires having one of its edges formed with a flanged side, a removable plate for the second side, bolt members between the sides, nuts engaging the bolts, a tire adapted to rest on the bolts, a flat ring member also resting on the bolts, a threaded valve carrying stem secured to the ring member and adjustably secured to the rim said ring member having flanged sides whose outer faces are arched and formed with continuous ribs and wedge-shaped strips of compressible material arranged between the said flanges of the ring and the inner thickened sides of the tire.

2. A rim for wheels carrying pneumatic tires having one of its edges formed with a flanged side, a removable plate for the second side, bolt members between the sides, nuts engaging the bolts, a tire adapted to rest on the bolts, a flat ring member also resting on the bolts, a threaded valve carrying stem secured to the ring member and adjustably secured to the rim or felly, said ring member having flanged sides whose outer faces are arched and formed with continuous ribs and wedge-shaped strips of compressible material arranged between the said flanges of the ring and the inner thickened sides of the tire, a continuous rib on the inner face of the rim adjacent to the outer end thereof, and a compressible gasket contacting said rib and being in turn contacted by the removable side of the rim or felly.

In testimony whereof I affix my signature.

JAMES C. BALLEW.